April 15, 1952     A. T. EWELL     2,593,284
BELTING
Filed Dec. 19, 1945     2 SHEETS—SHEET 1
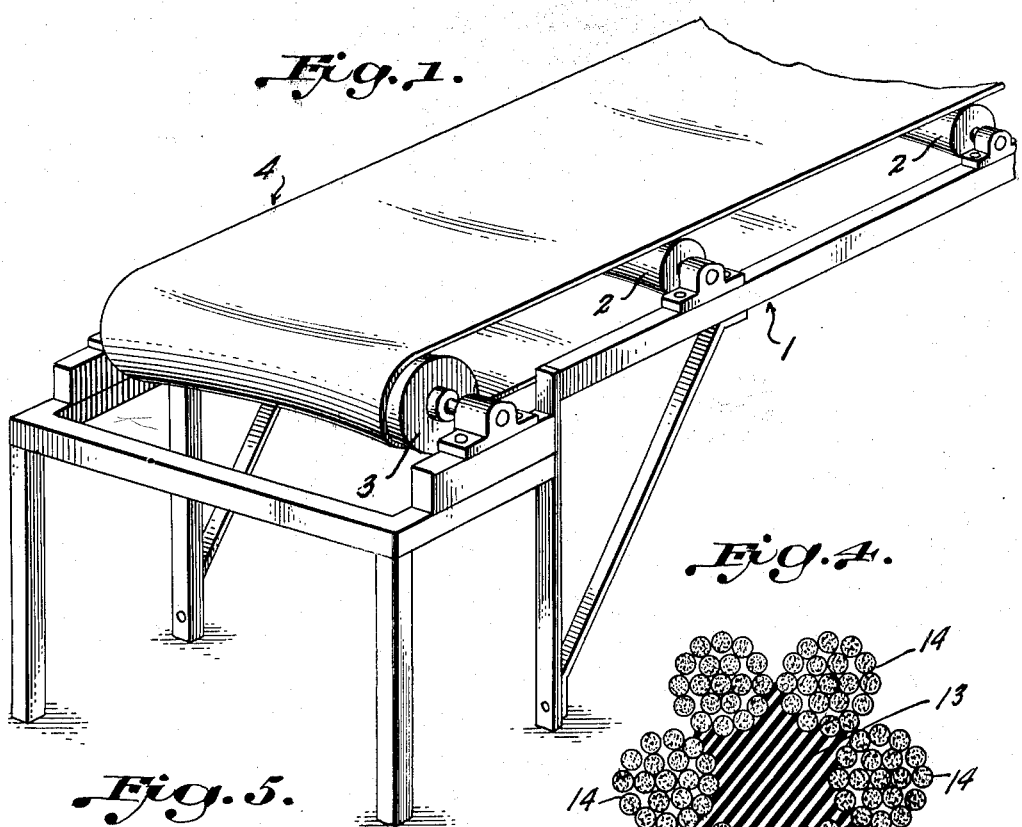
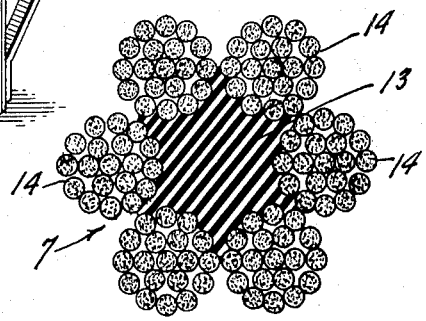
INVENTOR.
Andrew Travers Ewell,
BY
Semmes Keegin Beale & Semmes
ATTYS.

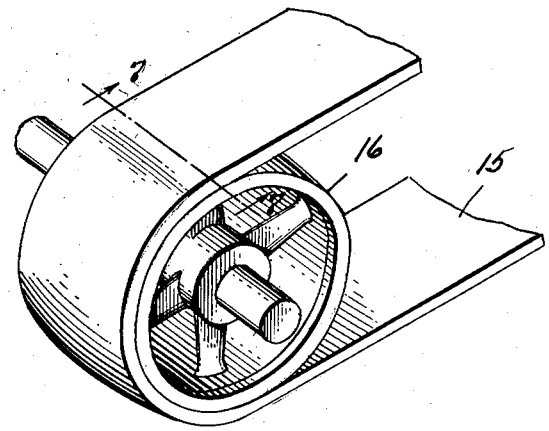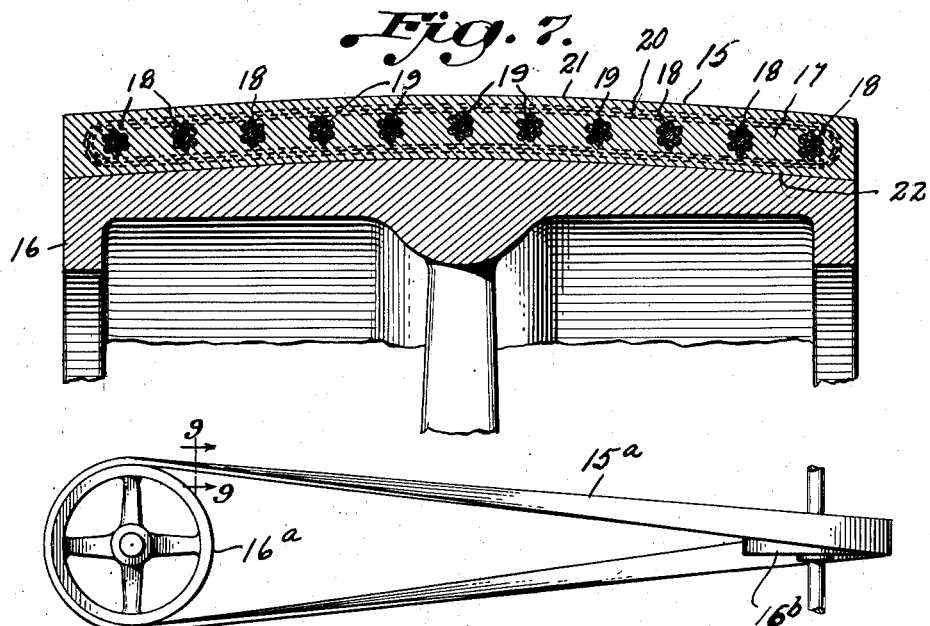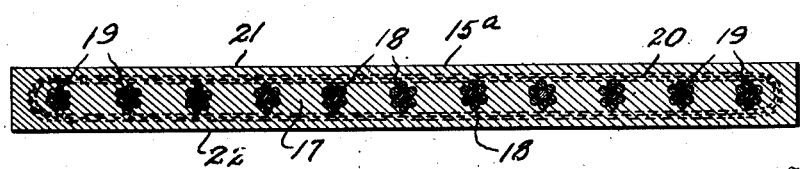

Patented Apr. 15, 1952

2,593,284

UNITED STATES PATENT OFFICE 2,593,284

BELTING

Andrew Travers Ewell, Atlanta, Ga., assignor to Don P. Gavan, Atlanta, Ga.

Application December 19, 1945, Serial No. 635,861

8 Claims. (Cl. 198—191)

The present invention relates to endless belts and more particularly to flat belts of the endless type known commonly as rubber belting and consisting of one or more plies of fabric bonded together with a rubber compound and covered top and bottom with a rubber compound.

Endless belts of the above character are employed both for conveying materials from one point to another and for the transmission of power. Belt conveyors are widely used because of their ability to handle any bulk material or light package material which may be properly fed onto the conveyor, provided it will not adhere strongly thereto or deleteriously attack the belt material. Moreover, a single belt conveyor may be employed to carry the material substantially great distances either horizontally or at reasonable inclines. They also have a high carrying capacity, low power consumption and low attendance and maintenance cost. For power transmission, rubber belting is particularly advantageous because of its high tensile strength, high coefficient of friction between belt and pulley and its high resistance to deterioration and other changes due to moisture.

In the simplest form, both of conveyor and power transmission, the endless belt passes over a driving and a driven pulley, being tensioned therebetween either with or without a system of idlers between the driving and driven pulleys for supporting, guiding and/or tensioning the belt. In conveyors handling granular bulk material, it is customary to trough the load carrying portion of the belt, that is, give the belt a generally U-shaped cross sectional configuration by means of troughing pulleys having a correspondingly similar shape. Because of destructive, unequal stretching which would occur in belts heretofore proposed, should the terminal pulleys also be troughed, either straight faced terminal pulleys or pulleys with a very slight crown (not more than $\frac{1}{16}$" per foot of face width greater than end diameter) are universally used. Such straight faced pulleys obviously flatten the troughed belt at the feed and discharge ends of the conveyor and necessitate the use of guiding skirts at the edges of the belt, adjacent the flattened sections, to prevent material spilling over the sides. The number of plies of fabric built into the conveyor belts heretofore proposed (varying, of course, with the belt width) have solely determined the working pull of the belt, which in turn has determined the length of conveyor which may be used. The number of plies in troughing belts must be limited to such an extent that the unloaded belt will be sufficiently flexible transversely to trough in contact with the troughing pulleys in order that it may be "trained" (made to run straight) with a result that the length of troughing conveyors heretofore possible has been severely restricted.

In flat belt drives for the transmission of power, where crowned pulleys are used, and particularly in the case of crossed belts and belts connecting non-parallel pulleys, unequal stretching in the longitudinal increments of the belt also occurs which results in a rapid destruction of the belt.

It is therefore one of the principal objects of this invention to provide endless flat belting which will overcome disadvantages resulting from unequal longitudinal stressing.

Another object of the invention is to provide endless flat belting, particularly of the so-called rubber belt type, which has improved flexibility and improved longitudinal stress carrying properties.

Another object of the invention is to provide flat endless belting which has differential elasticity in different longitudinal sections thereof.

A further object of the invention is to provide an endless belt for use in troughing conveyors in which the degree of longitudinal elasticity increases from the center section to the edges of the belt to permit not only full troughing of the unloaded belt on troughing idlers but also permit full troughing of the belt in its passage about troughed terminal pulleys of such a conveyor, and thereby permit full loading of the belt from end to end of the conveyor.

A still further object of the invention is to provide belting of the above character which incorporates longitudinal flexible tensioning members having varying degrees of elasticity.

A still further object of the invention is to provide a flat belt for use with pulleys having different diameters from end to end of the pulley, in which the degree of longitudinal elasticity varies substantially proportionately with said different diameters.

With the above and other objects and advantages in view, as will become more apparent during the course of the following description, the invention consists in the parts and combinations hereinafter set forth, with the understanding that various changes may be made therein, by those skilled in the art, without departing from the spirit of the invention or exceeding the scope of the appended claims.

In order to make the invention more clearly understood, it has been made the subject of illustration in the accompanying drawings which show several embodiments of the invention.

In the drawings:

Figure 1 is a view in perspective of one end of a troughing conveyor having a belt constructed in accordance with this invention.

Figure 2 is a fragmental side elevational view of one of the elastic tensioning members incorporated in the belt shown in Figure 1.

Figure 3 is a cross sectional view of one-half of the belt shown in Figure 1, the belt being symmetrical about the center line indicated in this figure.

Figure 4 is a cross sectional view of the elastic tensioning member shown in Figure 2.

Figure 5 is a cross sectional view of one of the non-elastic tensioning members incorporated in the belt shown in Figure 1.

Figure 6 is a fragmental perspective view of a crowned pulley and a power transmission belt which is constructed in accordance with this invention.

Figure 7 is a cross sectional view taken on the line 7—7 of Figure 6.

Figure 8 is an elevational view of an arrangement of power transmission belt and pulleys arranged on axes at substantial right angles to each other.

Figure 9 is a cross sectional view of the belt shown in Figure 8.

Generally, the invention consists of a flat flexible belt which is designed for use under conditions where it may be subject to different longitudinal stretching in different longitudinal sections thereof, and comprises a flexible body in which are embedded a plurality of longitudinal flexible tensioning members in the form of cables or wire rope which have different degrees of elasticity, at least one of the tensioning members in the longitudinal section of the belt, subject to the least stretching, being non-elastic, and preferably the degree of elasticity of the tensioning members in the sections of the belt, subject to greater stretch, being substantially proportional to the amount of stretch to which their respective sections of the belt are subjected.

Referring now to Figure 1, there is shown a troughing conveyor having a supporting structure 1 on which are rotatably journaled a series of dished troughing idler pulleys 2 and a similarly dished terminal pulley 3. Only one end of the conveyor is shown in Figure 1. It is to be understood, however, that a second terminal pulley similar to the pulley 3 is provided at the opposite end of the conveyor and that one of the terminal pulleys is to be driven by suitable driving mechanism. Passing over the troughing idlers 2 and about the terminal pulleys is a flexible endless belt designated generally as 4. As best seen in Figure 3, the belt 4 comprises a flexible body 5 which is inherently more or less elastic. Embedded within the body 5 are a plurality of tensioning members designated generally as 6 and 7 and adjacent which are one or more plies of fabric 8. The tensioning members 6 and 7 and the fabric plies 8, which may be skim coated if desired, are bonded together by means of the body material which is preferably a rubber compound. The belting may be manufactured by any well known process which vulcanizes the rubber material and forms a top coat or surface 9 and a bottom coat or surface 10 for the belt. As above set forth, the degree of elasticity of the longitudinal tensioning members 6 and 7 which are embedded in the belt varies in accordance with the degree of stretch to which the different longitudinal sections of the belt are subjected. It will be readily understood that in a troughing conveyor such as shown in Figure 1, which employs troughed or dished terminal pulleys, the least stretch will be in that section of the pulleys of the smallest diameter, in other words the center of the pulley, and the greatest amount of stretch to which the belt passing around these pulleys would be subjected would be at the ends of the pulley or the edges of the belt. Accordingly, therefore, the tensioning members adjacent the edges of the belt should be substantially elastic while those adjacent the center of the belt should be substantially non-elastic. Such an arrangement is shown in Figure 3 where non-elastic tensioning members 6 are positioned adjacent the center of the belt and elastic tensioning members are positioned adjacent the edges of the belt. The ratio of non-elastic to elastic tensioning members will vary of course with the radius of curvature or the general shape of the terminal pulleys of the conveyor but in most instances, however, the center one-third of the belt has embedded therein non-elastic tensioning members and the outer two-thirds have elastic tensioning members. The non-elastic tensioning members preferably are twisted steel wire rope or cable, such as shown in Figure 5, composed of a plurality of strands of wire 11 twisted about a center wire strand 12.

The construction of the flexible tensioning members 7 is best shown in Figures 2 and 4 and comprises an elastic core 13 about which are twisted or laid strands of wire 14. It is to be noted from Figure 2 that the wire strands 14 are laid on the core in helices having a substantially smaller pitch than found in ordinary wire rope to permit a greater longitudinal stretch in the tensioning member and return to its original shape after stretching than would be possible in rope with the strands laid at a substantially large pitch. Preferably, the tensioning member 7 is of preformed construction in order that the original shape of the member may be maintained. The material of the core 13 may be any suitable elastic material such as natural or synthetic rubber or yarns made of suitable elastic plastic materials either of acetate or viscose types or yarn composed of synthetic linear polyamide such as sold under the trade name of "nylon." This latter material is particularly suitable for the core 13 because of its extremely high tensile strength and high degree of elasticity. If a synthetic or natural rubber in its crude form is employed for making the tensioning member 7 it is preferable that the wire rope strands 14 be first tinned before winding about such uncured rubber in order to prohibit corrosion of the steel. Preferably the rope 7 is manufactured in such a manner that the wire strands are substantially embedded in the core material such as shown in Figure 4. This may be accomplished by winding the strands about the uncured rubber and the rubber cured after winding.

Since the diameter of a terminal pulley 3 increases from the center toward the ends in progressively increasing diameters, it is preferable that the degree of elasticity of the elastic tensioning members 7 increase substantially in proportion with the increase in diameter of that portion of the pulley over which these tensioning members pass. This may be accomplished by having the tensioning members 7 adjacent the edges of the belt with a core diameter larger than the core diameter of those adjacent the center section of the belt and the core diameters of the intermediate members 7 between the above-mentioned, increase progressively from the center section toward the edge. Under conditions where the edge sections of the belt are subjected to extreme stretch the cores 13 may be made hollow which would substantially increase their elasticity.

The fabric ply material 8 of the present belt is employed mainly to take transverse stresses in the belt since the tensioning members 6 and 7 take substantially all of the longitudinal stress. In accordance with this invention, the number of plies of the fabric may be kept low and therefore provide a belt which is extremely flexible transversely and will fully trough in the conveyor idlers even in an unloaded condition. This ply material may be either nylon or any suitable acetate or viscous plastic and/or cotton woven in either an open or close mesh fabric. Alternately, the plies 8 may be of corded construction and if found desirable for certain uses breaker strips may be incorporated in the body of the belt.

A conveyor belt constructed according to the foregoing will obviously readily pass over and conform to the shape of troughing pulleys, both idler and terminal, and permit full troughing the entire length of the conveyor. The advantages gained by such full troughing will be obvious in that full loading of the conveyor from end to end without spilling, such as would occur in the passage of the conveyor belt over a flat face pulley, is possible.

The inherent properties of belting constructed in accordance with the foregoing, in addition to being advantageous in troughing conveyors, also find advantageous use in flat belting employed in the transmission of power, particularly in installations where crowned pulleys, such as shown in Figure 6, are used or where belts must be crossed in reversing motion of two pulleys or where the pulleys rotate about axes at an angle to each other such as shown in Figure 8.

The transmission belt for use with crowned pulleys is best shown in the cross sectional view of one in Figure 7. This belt is constructed in a manner similar to the conveyor belt described above except that the face curvature of a crowned pulley is of course opposite that of a troughed pulley; in other words, the larger diameter of the crowned pulley is at the center and therefore the non-elastic tensioning members should be adjacent the edges of the belt and the elastic tensioning members in the center section. Such a belt is indicated generally as 15 and, as shown in Figure 6, passes around a crowned pulley 16. The belt is composed of a flexible and preferably somewhat elastic body 17 in the longitudinal sections of which adjacent the edges thereof are embedded a plurality of parallel non-elastic tensioning members 18 which may be similar to the tensioning members 5 described above. In the center section of the body 17 are embedded elastic tensioning members similar to the elastic tensioning members 7 of the conveyor belt. The belt 15 may likewise incorporate plies of fabric material 20, and a rubber top coat 21 and bottom coat 22 may be provided for increasing friction between belt and pulley and for protection of the ply material. Also as in the case of the conveyor belt, the degree of elasticity of the different flexible tensioning members may vary in accordance with the diameters of those portions of the crowned pulley over which the tensioning members pass.

In belt drives the center line of a flat belt advancing on the pulley should lie in a plane passing through the mid-section of the pulley at right angles to the shaft. This is true whether the pulley shafts are parallel or at angles to each other, and in a drive such as shown in Figure 8, for instance, this center line would be the section of the belt subject to the least stretch. Accordingly, in the transmission belt such as indicated as 15a which passes about pulleys 16a and 16b, shown in Figure 8, the non-elastic tensioning members 18 or steel cables are positioned as indicated in Figure 9 in the center section of the belt, and the elastic tensioning members 19 are positioned adjacent the edges of the belt which will be the portions of the belt subjected to stretch in a drive such as shown in Figure 8 and in a crossed belt drive.

From the foregoing, it will be readily understood that a belt constructed in accordance with this invention will have improved properties over those heretofore proposed. More particularly, the non-elastic tensioning members built into the belt will substantially increase its longitudinal tensile strength and as a result improve its lateral flexibility because of the fact that the longitudinal tensile strength of the belt is not dependent upon a fabric ply material and therefore a lighter ply may be used. Because of the differential in degree of elasticity in the different longitudinal sections of the belt, the belt adapts itself readily for passage over either straight, convex or concave pulley faces or any combinations of these, either aligned parallel or at angles to each other. Also because of its elastic properties, increased coefficient of friction between belt and pulley is provided, reduced compensation for initial stretch in a belt newly put into service is provided, and a longer life for the belt is assured.

I claim:

1. Flat endless belting of the character described and subject to differential longitudinal stretching in different longitudinal sections thereof, comprising a plurality of longitudinal flexible tensioning members adapted to carry substantially the longitudinal tension stresses on the belt, a body of flexible material in which the tensioning members are embedded, the tensioning members subject to least stretch being substantially non-elastic and the tensioning members subject to greater stretch being substantially elastic, said substantially non-elastic tensioning members comprising wire rope consisting of twisted wire strands, and the elastic tensioning members comprising wire rope having wire strands twisted about a core of elastic plastic yarn.

2. Flat endless belting of the character described comprising a group of longitudinal tensioning members laid side by side and in parallel relationship to each other, a body of flexible material in which the tensioning members are embedded, the tensioning members subject to least stretch being non-elastic, and the tensioning members subject to greater stretch including a plurality of adjacent elastic members parallel to and spaced from the non-elastic members and each other, the degree of elasticity increasing progressively in succeeding of the elastic tensioning members laterally removed from the non-elastic tensioning members.

3. In a flat belt for passage about pulleys or the like in which the diameters thereof vary progressively from the center section of the pulley to the ends thereof, the combination comprising a plurality of longitudinal flexible tensioning members arranged side by side and parallel to each other, a body of flexible material in which the tensioning members are embedded, at least one of said tensioning members lying in that portion of the belt adapted to pass over that portion of the pulley having the least diameter being substantially non-elastic, and the tensioning members adapted to pass over those portions of the belt having greater diameters being substantially elastic, the degree of elasticity of the latter named tensioning members increasing proportionately with increase in diameter of the portions of the pulley over which the said latter named tensioning members are adapted to pass.

4. A troughing conveyor belt comprising a group of flexible longitudinally extending tensioning members arranged side by side and parallel to each other, a flexible body member in which the tensioning members are embedded, the tensioning members lying in the center longitudinal section of said body being composed entirely of twisted strands of steel and the tensioning members lying in the opposed outer longitudinal sections of said body consisting of wire strands twisted about a center core composed of an elastic material.

5. Flat endless belting of the character described and subject to differential longitudinal stretching in different longitudinal sections thereof, comprising a plurality of longitudinal flexible tensioning members, a body of flexible material in which the tensioning members are embedded, the tensioning members subject to least stretch being substantially non-elastic and the tensioning members subject to greater stretch being substantially elastic, said non-elastic tensioning members comprising wire rope composed of twisted wire strands and said elastic tensioning members comprising wire rope composed of wire strands twisted about a core composed of elastic material.

6. Flat endless belting of the character described and subject to differential longitudinal stretching in different longitudinal sections thereof, comprising a plurality of longitudinal flexible tensionng members, a body of flexible material in which the tensioning members are embedded, the tensioning members subject to least stretch being substantially non-elastic and the tensioning members subject to greater stretch being substantially elastic, said non-elastic tensioning members comprising wire rope composed of twisted wire strands and said elastic tensioning members comprising wire strands twisted about a core composed of rubber.

7. Flat endless belting of the character described and subject to differential longitudinal stretching in different longitudinal sections thereof, comprising a plurality of longitudinal flexible tensioning members, a body of flexible material in which the tensioning members are embedded, the tensioning members subject to least stretch being substantially non-elastic and the tensioning members subject to greater stretch being substantially elastic, said non-elastic tensioning members comprising wire rope composed of twisted wire strands and said elastic tensioning members comprising wire strands twisted about a core composed of an acetate yarn.

8. Flat endless belting of the character described and subject to differential longitudinal stretching in different longitudinal sections thereof, comprising a plurality of longitudinal flexible tensioning members, a body of flexible material in which the tensioning members are embedded, the tensioning members subject to least stretch being substantially non-elastic and the tensioning members subject to greater stretch being substantially elastic, said non-elastic tensioning members comprising wire rope composed of twisted wire strands and said elastic tensioning members comprising wire strands twisted about a core composed of synthetic linear polyamide yarn.

ANDREW TRAVERS EWELL.

REFERENCES CITED

The following references are of record in the file of this patent:

UNITED STATES PATENTS

| Number | Name | Date |
|---|---|---|
| 204,368 | Petchell | May 28, 1878 |
| 443,743 | Black | Dec. 30, 1890 |
| 870,044 | Nettenstrom | Nov. 5, 1907 |
| 1,491,412 | Mowrey | Apr. 22, 1924 |
| 1,998,011 | Gladwin | Apr. 16, 1935 |
| 2,107,013 | Morgan | Feb. 1, 1938 |